United States Patent
Murphy et al.

(10) Patent No.: US 8,218,931 B2
(45) Date of Patent: Jul. 10, 2012

(54) D 1413 HT RADIATION CURABLE COATINGS FOR OPTICAL FIBER

(75) Inventors: Edward J. Murphy, Arlington Heights, IL (US); Timothy Bishop, Algonquin, IL (US); Steven R. Schmid, East Dundee, IL (US)

(73) Assignee: DSM IP Assets B.V., Heerlen (NL)

( * ) Notice: Subject to any disclaimer, the term of this patent is extended or adjusted under 35 U.S.C. 154(b) by 396 days.

(21) Appl. No.: 12/611,562

(22) Filed: Nov. 3, 2009

(65) Prior Publication Data

US 2010/0124398 A1  May 20, 2010

Related U.S. Application Data

(60) Provisional application No. 61/111,088, filed on Nov. 4, 2008, provisional application No. 61/213,743, filed on Jul. 9, 2009.

(51) Int. Cl.
G02B 6/02 (2006.01)
(52) U.S. Cl. ........................................ 385/128
(58) Field of Classification Search ................ 385/128
See application file for complete search history.

(56) References Cited

U.S. PATENT DOCUMENTS

| | | | |
|---|---|---|---|
| 4,472,019 A | 9/1984 | Bishop et al. | |
| 4,741,958 A | 5/1988 | Bishop | |
| 5,891,930 A | 4/1999 | Lapin et al. | |
| 5,977,202 A | 11/1999 | Chawla et al. | |
| 6,362,249 B2 | 3/2002 | Chawla | |
| 6,438,306 B1 | 8/2002 | Bishop | |
| 6,579,914 B1 | 6/2003 | Gantt et al. | |
| 6,714,712 B2 | 3/2004 | Bishop | |
| 6,797,740 B2 * | 9/2004 | Abel et al. | 522/81 |
| 7,174,079 B2 | 2/2007 | Abel et al. | |
| 7,276,543 B2 | 10/2007 | Bishop | |
| 7,390,858 B2 | 6/2008 | Knouse | |
| 2004/0241416 A1 * | 12/2004 | Tian et al. | 428/304.4 |
| 2007/0122092 A1 | 5/2007 | Castellani | |
| 2008/0226914 A1 | 9/2008 | Norlin et al. | |
| 2008/0241535 A1 | 10/2008 | Cattron et al. | |

FOREIGN PATENT DOCUMENTS

| | | |
|---|---|---|
| BR | 2001011831 | 1/2002 |
| CN | 1215131 | 4/1999 |
| CN | 1239426 | 12/1999 |
| EP | 1 297 077 B1 | 12/2005 |
| EP | 1 294 653 | 4/2006 |
| EP | 1 277 077 | 2/2008 |
| IN | 2002MN01817 | 2/2005 |
| JP | 59-074507 | 4/1984 |
| JP | 63-006507 | 2/1988 |
| JP | 2004-501403 | 1/2004 |
| JP | 2004-504250 | 2/2004 |
| WO | 01/00563 A1 | 1/2001 |
| WO | 02/06175 A1 | 1/2002 |

OTHER PUBLICATIONS

International Preliminary Report on Patentability and Written Opinion dated May 19, 2011 issued in co-pending PCT Application PCT/US2009/005941.
Ellison, M. M., et al., "Designing UV-Curable Materials for High-Temperature Optical Fiber Applications", Painting and Coatings Industry, posted on Apr. 1, 2008, (http://www.pcimag.com/copyright/BNP_GUID_9-5-2006_A_10000000000000291265?view=print).
Mendez, Alexis et al, Specialty Optical Fibers Handbook, Elsevier, "Copyright Notice Page, (2007), Preface pages and Chapter 4, pp. 95-122," Optical Fiber Coatings by Schmid, S.R. et al.
Technical Data Sheet: SR531, "Cyclic Trimethylolpropane Formal Acrylate", 1 page, 2003.
Technical Data Sheet: CN116, "Modified Epoxy Acrylate", 1 page, 2003.
Technical Data Sheet: CN118, "Modified Epoxy Acrylate", 1 page, 2003.
Technical Data Sheet: CN549, "Acrylic Oligomer", 1 page.
Technical Data Sheet: CN2102E, "Epoxy Acrylate", 1 page.
Dow Corning 57 Additive, "Paints, Inks and Coatings", (Aug. 23, 2004), 2 pages.
Dow Corning 190 Fluid, 4, Ref. No. 22-1616C-01, (May 17, 2002), 4 pages.
CYTEC, Energy Curable Resins, Product Guide: Coatings and Inks Americas, Epoxy Acrylates, 3 pages.
Esacure by Iamberti, ESACURE KIP 150, 1 page.
Supplementary European Search Report issued in co-pending EP Application No. 09825103.6 dated Mar. 2, 2012.

* cited by examiner

Primary Examiner — Omar Rojas
(74) Attorney, Agent, or Firm — Nixon & Vanderhye, PC

(57) ABSTRACT

A Radiation Curable Coating composition, which may be used as an inner primary coating, an outer primary coating, single coats, a matrix, or a buffer resin composition, comprising: A Radiation Curable Coating composition, which may be used as an inner primary coating, an outer primary coating, single coats, a matrix, or a buffer resin composition, comprising at least one radiation-curable oligomer wherein said at least one radiation curable oligomer is a fatty-acid modified epoxy acrylate; at least one ethylenenic unsaturated reactive diluent; wherein said oligomer(s) and diluent(s) are selected from the group that does not include moieties with Urethane chemistry. This composition, when tested, is found to have resistance to thermal degradation as measured by less than 10% weight loss after exposure of cured specimens in a natural convection furnace for 100 hours at 180° C.

5 Claims, No Drawings

D 1413 HT RADIATION CURABLE COATINGS FOR OPTICAL FIBER

CROSS REFERENCE TO RELATED APPLICATIONS

This patent application claims priority to U.S. Provisional Patent Application 61/111,088, filed Nov. 4, 2008 and to U.S. Provisional Patent Application 61/213,743, filed Jul. 9, 2009, both of which are incorporated by reference, in their entirety.

FIELD OF THE INVENTION

The present invention relates generally to Radiation Curable Coatings suitable for use on Optical Fibers. These High Temperature Resistant Coatings may be used as Inner Primary Coatings also known as Primary Coatings, Outer Primary Coatings also known as Secondary Coatings, Single Coats, Matrix and Upjacketing Compositions for optical fiber applications.

BACKGROUND OF THE INVENTION

Glass optical fibers, cables, and sensors have proven advantageous over traditional copper-based data transmission media; and have found many uses in distributed sensing as both sensor and signal transmission link. These uses often are in high temperature harsh environments, such as oil wells or under-hood automotive applications.

The thermal stability of the optical fiber is a critical functional property for the success of the use of the optical fiber in the high temperature harsh environment. The coatings on an optical fiber have thermal stability issues relating to their composition and the heat stability of the components of the composition.

The state of the art coating for optical fiber in high temperature harsh environments includes hermetic carbon coatings, other thermally cured coatings comprising reactive silicone resins or polyamides, silicone resin based UV curable coatings as described in U.S. Pat. No. 5,891,930 and certain other UV curable coatings as described and claimed in U.S. Pat. Nos. 4,741,958, 5,977,202, 6,362,249, 6,438,306, 6,714, 712, 7,174,079, and 7,276,543.

In Japanese Patent Application, JP63006507, coating materials contain a photopolymerization initiator and a reaction product of epoxy resin, dicarboxylic acid of long-chained aliphatic compound, and acrylic acid or methacrylic acid. The materials have flexibility, short hardening time, and good adhesion to optical fibers. Thus, Epon 828 (Bisphenol A diglycidyl ether), SB-20 (C20 fatty acid dimer), acrylic acid, triethylamine, and hydroquinone were reacted to give a reaction product (number average mol. weight 2000) which was mixed with 2-hydroxy-3-phenoxypropyl arylate and benzoin iso-Butyl ether to give a fiber coating material having low viscosity. Optical fibers coated with the material had a uniform surface and high strength. No mention is made in this published Japanese Patent application of the High Temperature Resistance of these cured coatings.

In Japanese Patent Application, JP59074507, Optical fibers are prepared with 2 coating layers wherein the 1st layer, closest to the core glass fiber surface, is composed of a resin composition (~5μ thick) containing a nonsilicone type parting agent. This coating on the optical fiber can be removed easily and hence the fiber can be connected to other optical fibers by simple operations. Thus, a glass rod (for optical fiber) 30 mm in diameter was drawn at 2100° C. to form a fiber 125μ in diameter, coated with a UV-hardenable epoxy acrylate (1.5μ thick) containing stearic acid 1.0 weight %, irradiated by UV radiation to form a hardened layer, coated with dimethylpolysiloxane (80μ thick), baked by IR radiation, and coated with nylon 12 to give the optical fiber. The layer was completely removed when the nylon 12 was removed with a tool. No mention is made in this published Japanese Patent application of the High Temperature Resistance of these cured coatings.

These types of coatings have advantages and disadvantages. However, to date radiation curable coatings have been found to enjoy very limited use in high temperature environments due to the limited function at temperatures of 100° C. or higher for an extended time period.

There are commercially available optical fibers that are advertised as "High Temperature Resistant Fibers" such as Draka Elite High Temperature BendBright XS, which is described on their website as having a "High temperature resistant Acrylate coating". The website is silent about further details concerning the coating used on these High temperature resistant Optical Fibers so there is no information available as to exactly what the compositions are, nor what the functional properties of the compositions are, nor what the % weight loss is of these coatings after 100 hours at 180° C.

It would be desirable to have access to a radiation curable coating for an optical fiber that upon curing achieved a resistance to thermal degradation such that the optical fiber was still viable as a communications medium at elevated temperatures.

SUMMARY OF THE INVENTION

The first aspect of the instant claimed invention is a Radiation Curable Coating composition, which may be used as an inner primary coating, an outer primary coating, single coats, a matrix, or a buffer resin composition, comprising:
(a) at least one radiation-curable oligomer wherein said at least one radiation curable oligomer is a fatty-acid modified epoxy acrylate;
(b) at least one ethylenenic unsaturated reactive diluent;
(c) one or more photoinitiators,
(d) optionally one or more additives selected from the group consisting of
 (d1) stabilizing additives, and
 (d2) adhesion promoting additives;
wherein said oligomer(s) and diluent(s) are selected from the group that does not include moieties with Urethane chemistry;
and wherein said composition, after cure, has resistance to thermal degradation as measured by less than 10% weight loss after exposure of cured specimens in a natural convection furnace for 100 hours at 180° C.

The second aspect of the instant claimed invention is the Radiation Curable Coating Composition of the first aspect wherein said radiation-curable composition does not include any pigments, dyes or other color changing moieties.

DETAILED DESCRIPTION OF THE INVENTION

The instant claimed invention is a Radiation Curable Coating composition, which may be used as an inner primary coating, an outer primary coating, single coats, a matrix, or a buffer resin composition, comprising:
(a) at least one radiation-curable oligomer wherein said at least one radiation curable oligomer is a fatty-acid modified epoxy acrylate;
(b) at least one ethylenenic unsaturated reactive diluent;
(c) one or more photoinitiators, (d) optionally one or more additives selected from the group consisting of
(d1) stabilizing additives, and
(d2) adhesion promoting additives;
wherein said oligomer(s) and diluent(s) are selected from the group that does not include moieties with Urethane chemistry;
and wherein said composition, after cure, has resistance to thermal degradation as measured by less than 10% weight loss after exposure of cured specimens in a natural convection furnace for 100 hours at 180° C.

In the instant claimed invention, the at least one radiation curable oligomer is a fatty-acid modified epoxy acrylate. The fatty-acid modified epoxy acrylate is any compound or resin containing one or more epoxy groups per molecule, preferably two epoxy groups per molecule. For example, the epoxy-containing compound can be an aromatic or cycloaliphatic compound or resin comprising one or more epoxy groups per molecule. Preferably the epoxy-containing compound is an aromatic epoxy-containing compound.

Preferably, the monoacid is a fatty acid, more preferably a long chain monoacid. A long chain monoacid, or long chain fatty acid, is characterized as having between 12 and 28 carbon atoms in their chain; more preferably, between 12 and 24 carbon atoms. Most fatty acids have 18 carbon atoms in their chain, but also a higher number of carbon atoms in naturally derived oils is possible. Preferably, naturally derived fatty acids or oils from which fatty acids are derived, as known to those skilled in the art, are fatty acids or oils originating from vegetable or animal sources.

Suitable fatty acid modified epoxy acrylate compounds are available commercially as Ebecryl 3605, Ebecryl 3702, Ebecryl 3708, Neorad E-20, Sartomer CN 118, Sartomer CN 118, Sartomer CN 2101, Sartomer CN 120Z, Cytec 3605 and Photomer 3082.

The weight percent of fatty-acid modified epoxy acrylate present in the composition of the instant claimed invention is from about 40 weight percent to about 99 weight percent; preferably from about 60 weight percent to about 99 weight percent, more preferably from about 65 weight percent to about 85 weight percent and most preferably from about 65 weight percent to about 80 weight percent.

It is important that the oligomer used does not use urethane chemistry. A urethane oligomer is here defined as an oligomer containing one or more carbamate moieties: —O—C(O)—NH—

The reason it is important that carbamate moieties not be present is that if they are present the high temperature resistance of the coating is negatively affected.

In the instant claimed invention, there is present at least one ethylenenic unsaturated reactive diluent.

The radiation-curable coating compositions of the invention optionally further comprise at least one ethylenenic unsaturated reactive diluent which can be used to adjust the viscosity of the composition. Ethylenenic unsaturated reactive diluent can be low viscosity monomers having at least one functional group capable of polymerization when exposed to actinic radiation. Ethylenenically unsaturated reactive diluents are known to people of ordinary skill in the art of radiation curable coatings for Optical Fiber. Suitable Reactive diluents for inclusion in the instant claimed invention, include, but are not limited to the following.

CD262, available from Sartomer, with a Chemical Abstract Services Registry Number of 72829-09-5 and a chemistry of dodecane deimethacrylate; CD-595, available from Sartomer, with a proprietary formula based on the chemistry of dodecane deimethacrylate; NNDMA, available from Jarchem Industries or Kowa America, with a Chemical Abstract Services Registry Number of 2680-03-7 and a chemistry of N,N-dimethylcrylamide; SR 489, available from Sartomer, with a Chemical Abstract Services Registry Number of 3076-04-8 based on the chemistry of tridecyl acrylate; SR489D, available from Sartomer, with a Chemical Abstract Services Registry Number of 3076-04-8 based on the chemistry of tridecyl acrylate; SR 495, available from Sartomer, with a Chemical Abstract Services Registry Number of 110489-05-9 based on the chemistry of acrylate ester; SR531, available from Sartomer, with a proprietary formula based on the chemistry of cyclic trimethylolpropane formal acrylate.

It is critical to performance that said radiation-curable composition does not include diluent(s) comprising moieties with Urethane chemistry. This is because of the sensitivity of Urethane moieties to degradation by heat.

The weight percent of ethylenenic unsaturated reactive diluent present in the composition of the instant claimed invention is from about 1 weight percent to about 60 weight percent; preferably from about 15 weight percent to about 60 weight percent and more preferably from about 25 weight percent to about 45 weight percent.

The coating composition of the invention optionally further comprises an antioxidant. The antioxidant may be selected from the group consisting of sterically hindered phenolic compound, for example 2,6-ditertiarybutyl-4-methylphenol, 2,6-ditertiarybutyl-4-ethyl phenol, 2,6-ditertiarybutyl-4-n-butyl phenol, 4-hydroxymethyl-2,6-ditertiarybutyl phenol, and such commercially available compounds as thiodiethylene bis(3,5-ditertiarybutyl-4-hydroxyl)hydrocinnamate, octadecyl-3,5-ditertiarybutyl-4-hydroxyhydrocinnamate, 1,6-hexamethylene bis(3,5-ditertiarybutyl-4-hydroxyhydrocinnamate), and tetrakis(methylene(3,5-ditertiary-butyl-4-hydroxyhydrocinnamate))methane, all available as Irganox 1035, 1076, 259 and 1010, respectively, from Ciba Geigy. Other examples of sterically hindered phenolics useful herein include 1,3,5-trimethyl-2,4,6-tris(3,5-ditertiarybutyl-4-hydroxybenzyl)benzene and 4,4'-methylene-bis(2,6-ditertiarybutylphenol), available as Ethyl 330 and 702, respectively, from Ethyl Corporation.

The coating composition of the invention optionally further comprises a photoinitiator or mixture of photoinitiators to facilitate cure of the compositions upon exposure to active radiation, and to provide a satisfactory cure rate. Commercially available photoinitiators are known to people of ordinary skill in the art.

Photoinitiators useful in the coating composition of the present invention include, but are not limited to, isobutyl benzoin ether; 2,4,6-trimethylbenzoyl, diphenylphosphine oxide; bis(2,4,6-trimethylbenzoyl)phenylphosphine oxide (sold as Irgacure 819, available from Ciba, with a Chemical Abstracts Services Registry Number of 162881-26-7); 1-hydroxycyclohexylphenylketone; 2-benzyl-2-dimethylamino-1-(4-morpholinophenyl)-butan-1-one; 2,2-dimethoxy-2-phenylacetophenone; perfluorinated diphenyltitanocene; 2-methyl-1-[4-(methylthio)phenyl]-2-(4-morpholinyl)-1-propanone; 2-hydroxy-2-methyl-1-phenylpropan-1-one; 4-(2-hydroxyethoxy)phenyl-2-hydroxy-2-propyl ketone dimethoxyphenylacetophenone; 1-(4-isopropylphenyl)-2-hydroxy-2-methylpropan-1-one; 1-(4-dodecylphenyl)-2-hydroxy-2-methylpropan-1-one; 4-(2-hydroxyethoxy)phenyl-2-(2-hydroxy-2-propyl)-ketone; diethoxyphenyl acetophenone; a mixture of (2,6-dimethoxybenzoyl)-2,4,4-trimethylpentylphosphine oxide and 2-hydroxy-2-methyl-1-phenyl-propan-1-one; benzophenone; 1-propanone, 2-methyl-1-1-(4-(methylthio)phenyl)2(4-morpholinyl); and mixtures thereof. Commercially available photoinitiators and their tradenames include the following:

Darocure 1173, available from Ciba, with a Chemical Abstracts Services Registry Number of 7473-98-5 and an aryl-ketone chemistry.

Esacure KIP150, available from Lamberti, with a proprietary formula and a chemistry of oligo-[2-hydroxy-2-methyl-1-[4-(1-methylvinyl)phenyl]propanone].

Irgacure 651, available from Ciba, with a Chemical Abstracts Services Registry Number of 24650-42-8 and a chemistry of 2,2-dimethoxy-2-phenylacetophenone.

Irgacure 907, available from Ciba, with a Chemical Abstracts Services Registry Number of 71868-10-5 and a chemistry of 2-methyl-1-[4-(methylthio)phenyl]-2-morpholinopropanone-1.

Other additives which can be used in the coating composition include, but are not limited to, catalysts, lubricants, slip agents, wetting agents, adhesion promoters, photosensitizers, such as, but not limited to, Chivacure BMS and Chivacure 2-ITX available from Chitec, and stabilizers. The selection and use of such additives is within the skill of the art.

In an embodiment of the invention, the composition includes one or more slip additives. Slip additives are commercially known and include DC-190 and DC-57. Most preferably, a blend of DC-190 and DC-57 is used. DC-57 is dimethyl, methyl(propyl(poly(EO))acetate) siloxane; CAS Registry Number 70914-12-4. DC-190 is a mixture of (a) from about 40.0 to about 70.0 weight % of dimethyl,methyl (propyl(poly(EO)(PO))acetate)siloxane; CAS Registry Number 68037-64-9; (b) from about 30.0 to about 60.0 weight % of poly(ethylene oxide propylene oxide) monoallyl ether acetate; CAS Registry Number 56090-69-8; (c) less than about 9.0 weight % polyether polyol acetate CAS Registry Number 39362-51-1. DC-57 and DC-190 are commercially available from Dow Corning.

There are existing references that describe the use of fatty acid modified epoxy acrylates. In radiation curable coatings that also contain pigments U.S. Pat. Nos. 6,797,740; 7,174,079, EP1294653 and EP1297077. Additional References that describe the use of fatty acid modified epoxy acrylates in radiation curable coatings that also contain pigments include: CN1215131, CN1239426, JP2004501403, JP2004504250, IN2002MN01817 and BR2001011831. There is no mention of thermal stability above 60° C. water soak test results in these references.

Applicants believe it is possible to obtain the exceptional heat resistance functional property in a radiation curable composition, after cure as measured by less than 10% weight loss after exposure of cured specimens in a natural convection furnace for 100 hours at 180° C. where limited amounts or organic pigments are present in the instant claimed composition. These organic pigments are well known to people of ordinary skill in the art of formulating pigmented radiation curable coatings for optical fiber. However, applicants believe it is possible to obtain even more exceptional heat resistance functional properties when the instant radiation-curable composition does not include any pigments, dyes or other color changing moieties. This is because the organic pigments typically used in radiation curable compositions are known to people of ordinary skill in the art of formulating radiation curable coatings for optical fiber to be susceptible to heat degradation.

After the Coating of the instant claimed invention is synthesized it may be used as an inner Primary Coating also known as a Primary Coating, an Outer Primary Coating also known as a Secondary Coating, A Single Coat, a matrix or an upjacketing material.

Persons of ordinary skill in the art know how to manufacture an optical fiber. Application of coatings to optical fibers typically takes place at the location where the optical fiber itself is manufactured.

As well known in the are, matching the line speed with the position and intensity of UV light is critical to effect full curing of the coating on the fiber. It has been found, for coatings of the instant claimed invention, that when run on a Draw Tower Simulator that had two fusion D bulbs, supplying UV energy at 600 watts/inch located after application of the primary coating and three fusion D bulbs, supplying UV energy at 600 watts/inch located after application of the secondary coating that optical fiber coated with the radiation curable coatings of the instant claimed invention could be run successfully as follows: It has been found that the fastest speed for application of the radiation curable coatings of the instant claimed invention is less than about 1000 meters/minute; preferably less than about 950 meters/minute, more preferably less than about 900 meters/minute, more highly preferably less than about 850 meters/minute and most highly preferably less than about 800 meters/minute. The lowest speed it is possible to apply the coatings of the instant claimed invention is the lowest commercially available processing speed for the Optical Fiber being coating. Accordingly, the lowest speed for application of the radiation curable coatings of the instant claimed invention is greater than about 50 meters/minute, preferably greater than about 100 meters/minute, more preferably greater than about 200 meters/minute, more highly preferably greater than about 300 meters/minute and most highly preferably greater than about 350 meters/minute.

The novel radiation curable compositions of the instant claimed invention may be applied on conventional optical fiber, bend resistant optical fiber and they can even be applied on hermetically sealed optical fiber.

First the Primary Coating is applied, and with wet on dry processing, the next step is for a source of radiation to be applied to the Primary Coating to cure the Primary Coating. With wet on wet processing the next step is to apply the Secondary Coating.

Either way, after the Primary Coating is applied, then the Secondary Coating is applied on top of the Primary Coating, the radiation is applied and the Secondary Coating is cured.

The radiation used to cure the coatings is any radiation capable of initiating the polymerization reaction. Radiation suitable for curing the coatings is known to include ultraviolet (UV) and electron beam (EB) radiation. The preferred type of radiation to cure the primary and Secondary Coatings of the invention used on optical fiber is UV radiation.

After the Secondary Coating is cured, a layer of "ink coating" is optionally applied and then the coated and inked optical fiber may be placed alongside other coated and inked optical fibers in a "ribbon assembly" and a radiation curable matrix coating is used to hold the optical fibers in the desired location in the ribbon assembly.

After the Secondary Coating is cured, a layer of "ink coating" is optionally applied and then the coated and inked optical fiber may be layed alongside other similarly coated and inked fibers in what is known as a "loose tube" configuration.

In one embodiment of the instant claimed invention, the radiation curable coating is being used either as a single coat system, formulated with an adhesion promoter, an inner primary coating, formulated with an adhesion promoter or as a secondary coating, formulated with no adhesion promoter, or as a matrix coating, formulated with no adhesion promoter.

When used as a Secondary Coating a commercially available radiation curable Primary Coating for Optical Fiber is used as the Primary Coating. Such Primary Coatings, include, but are not limited to DeSolite® DP-1004, DeSolite® 3471-1-129A, DeSolite® DP-1016 and Desolite® 3471-1-152A available from DSM Desotech Inc. Elgin Illinois, 1-847-697-0400.

It is believed, without intending to be bound thereby, that when the instant claimed compositions are used as either outer primary coatings, also known as secondary coatings, or as matrix coatings, or upjacketing coatings or buffering coatings that the enhanced thermal resistance properties of the cured coating will act in a protective manner towards the other cured coatings present on the fiber.

The compositions of the instant claimed invention may also be applied to high performance hermetically sealed optical fiber as either a single primary coating or as a secondary coating over a primary coating. The coating is viable for application to both single mode and multi-mode hermetically sealed optical fiber. If necessary, for application to hermetically sealed optical fiber, it is possible to formulate the radiation curable coatings of the instant claimed invention with a higher modulus (as measured on cured films of the coating).

The invention will be further explained by way of the following examples, without being limited thereto.

EXAMPLES

Tensile Strength, Elongation and Modulus Test Methods

The tensile properties of Radiation Curable Coatings for Optical Fiber are tested on films using a universal testing instrument, Instron Model 4201 equipped with a suitable personal computer and Instron software to yield values of tensile strength, percent elongation at break, and secant or segment modulus. Load cells have 2 or 20 pound capacity, or metric equivalents. To prepare the samples for testing, a drawdown (cured film) of each material to be tested is made on a glass plate and cured using a UV processor. The cured film is conditioned at 23±2° C. and 50±5% relative humidity for a minimum of sixteen hours prior to testing. A minimum of eight test specimens, having a width of 0.5±0.002 inches and a length of 5 inches, are cut from the cured film. To minimize the effects of minor sample defects, sample specimens are cut parallel to the direction in which the drawdown of the cured film was prepared. If the cured film is tacky to the touch, a small amount of talc is applied to the film surface using a cotton tipped applicator.

The test specimens are then removed from the substrate. Caution is exercised so that the test specimens are not stretched past their elastic limit during the removal from the substrate. If any noticeable change in sample length has taken place during removal from the substrate, the test specimen is discarded. If the top surface of the film is talc coated to eliminate tackiness, then a small amount of talc is applied to the bottom surface of test specimen after removal from the substrate.

The average film thickness of the test specimens is determined with a micrometer. At least five measurements of film thickness were made in the area to be tested (from top to bottom) and the average value used for calculations. If any of the measured values of film thickness deviated from the average by more than 10% relative, the test specimen is discarded. Film width is also measured. All specimens came from the same plate, and generally, at least six strips are needed to obtain tensile properties. After calibration and standardization, each test specimen is tested by suspending it into the space between the upper pneumatic grips such that the test specimen is centered laterally and hanging vertically. The upper grip (only) is locked. The lower end of the test specimen is pulled gently so that it has no slack or buckling, and it is centered laterally in the space between the open lower grips. While holding the specimen in this position, the lower grip is locked.

The sample number and sample dimensions are entered into the data system, following the instructions provided by the software package. Tensile measurement for the sample is then executed with the Instron device. This is repeated for additional specimens. The temperature and humidity are measured after the last test specimen from the current drawdown is tested. The calculation of tensile properties is performed automatically by the software package. The values for tensile strength, % elongation, and secant modulus are checked to determine whether any one of them deviated from the average enough to be an "outlier." If necessary, the procedure is repeated. A measure of toughness is calculated based on the ability of material to absorb energy up to the point of rupture, and that is determined by measuring the area under the stress-strain curve.

Thermal Stability of Optical Fiber Coatings Test Methods

A principal measure of "heat resistance" for radiation curable coatings for optical fiber is to monitor the weight loss of the cured coating with time at various temperatures in a suitable instrument or oven.

The Heat Resistance Results are reported as the % weight loss of a cured film of the composition over a certain duration of time and at a certain temperature. The Heat Resistance test method is also known as the "weight loss of the cured coating" test method. The steps in this test method are as follows:

1) Liquid samples of commercial or experimental coatings are accurately weighed to 0.0001 gram in aluminum weighing dishes whose empty weight is also determined to 0.0001 gram. The aluminum weighing dishes are standard for laboratory use and are 50-60 mm in diameter and 10-15 mm in depth. Such aluminum weighing dishes are available from VWR Scientific Products, and a particular weighing dish useful for development studies has catalog number 25433-008.
2) The liquid samples are at least 0.3 gram in initial weight but not more than 1.0 gram, and preferably were at least about 0.4 gram but not more than about 0.6 gram.
3) The liquid samples are allowed to spread and form a uniform film in the bottom of the weighing dish. In certain cases of high room temperature viscosity samples the dish and sample are warmed to 60° C. for 10-15 seconds on a standard laboratory hot plate, and the aluminum dish then gently rotated to aid in uniform spreading of the liquid samples.
4) The samples in the weighing dishes are then cured under a standard laboratory UV cure unit such as a Fusion Systems Model DRS-120N2Q with 300 Watt/inch, 13 mm D-bulb, with a dose of at least about 0.8 Joule/sqcm but not more than about 1.2 Joule/sqcm. The preferred dose is about 0.9 to about 1.0 Joule/sqcm. All samples are cured in a nitrogen atmosphere.
5) Once cured the specimens are again weighed on a suitable laboratory analytical balance to 0.0001 gram.
6) The weighed samples in the aluminum dishes are then placed in a laboratory furnace with natural convection at various temperatures. Such a laboratory furnace is available from Lindberg as a Type 51542 Furnace. The furnace is maintained at specified temperatures.

7) Periodically the samples in the aluminum dishes are removed from the Lindberg furnace, placed in a standard laboratory dessicator, and allowed to equilibrate to room temperature for a minimum of 5 minutes, but not more than 15 minutes.
8) The samples in the aluminum dishes are then weighed again on a suitable laboratory analytical balance to 0.0001 gram. Such a laboratory balance is available from Sartorius with model number BP2215.
9) Once weighed the samples in the aluminum dishes may be returned to the Lindberg furnace for further exposure to elevated temperature.
10) This process of exposure and weighing is continued for suitable periods to determine the relative durability of the respective samples as calculated by subtracting the tare weight of the respective aluminum weighing dishes, and determining the thermogravimetric weight loss of the respective samples as a percentage of the original UV cured specimen.

This procedure is found to be sufficiently accurate to determine the superiority of one sample over another over the course of typically 100 hours at 180° C. In certain cases multiple samples are run for extended periods to further determine the statistics of weight loss for this method. For Example 3 below it has been determined for 7 separate samples that the 95% confidence interval for exposures up to 408 hours at 180° C. is about +/−10% of calculated % weight loss with a regression $R^2>0.96$ and a regression equation of:

% Loss=[0.021×(exposure hours)]+3.069.

If desired the test temperature is adjusted from 180° C. to 200° C. Results from testing at 200° C. are indicated at that temperature. All other results are reported at 180° C.

The UV curable coatings of the instant invention are prepared in the usual manner well known to those experienced in the art. Selected ingredients are added in non-critical sequence to suitable clean vessels, usually concave-bottom round-wall stainless steel vessels, equipped with agitation, heaters and temperature controls. In certain instances high viscosity ingredients may be warmed in a hot box before addition to the vessel. It is usual to add ingredients while the contents of the vessel are under mild agitation. Mixing temperatures are commonly from about room temperature to about 60° C. Once all ingredients are added, the agitation is continued from about 1 hour to about 6 hours, or until all the ingredients are properly mixed and dissolved to uniformity. As is common practice the finished formula is subjected to suitable filtration immediately prior to packaging in suitable containers.

The first table in this section lists the ingredients used in the synthesis of the radiation curable coatings of the instant claimed invention. After the first table, there are three tables of examples of the instant claimed invention.

| Trade Name | CAS Registry Number | Function in Formula | Chemical Descriptor | Supplier |
|---|---|---|---|---|
| A-189 | 4420-74-0 | Adhesion Promoter | gamma-mercaptopropyl trimethoxy silane | Silquest |
| CD262 | 72829-09-5 | Diluent Monomer | dodecane deimethacrylate | Sartomer |
| CD-595 | proprietary | Diluent Monomer | dodecane diacrylate | Sartomer |
| Chivacure 2-ITX | 83846-86-0 | Photosensitizer/photoinitiator | 2-isopropyl thioxanthone | Chitetc Inc. |
| Chivacure BMS | 83846-85-9 | Photoinitiator | 4-benzoyl-4'-methyl diphenyl sulphide | Chitetc Inc. |
| CN-116 | proprietary | Oligomer | fatty-acid modified bisphenol A epoxy acrylate | Sartomer |
| CN-118 | proprietary | Oligomer | fatty-acid modified bisphenol A epoxy acrylate | Sartomer |
| CN120Z | 55818-57-0 | Oligomer | Proprietary epoxy diacrylate oligomer | Sartomer |
| CN-2101 | proprietary | Oligomer | fatty-acid modified bisphenol A epoxy acrylate | Sartomer |
| CN-549 | proprietary | Amine based Sensitizer for photoinitiator | amine-modified polyester tetraacrylate | Sartomer |
| Daracure 1173 | 7473-98-5 | Photoinitiator | aryl-ketone | Ciba |
| Dow Corning 190 | proprietary | Surface active agents | silicone | Dow Corning |
| Dow Corning 57 | proprietary | Surface active agents | silicone | Dow Corning |
| Ebecryl 3605 | proprietary | Oligomer | Bisphenol A epoxy acrylate oligomer | Cytec |
| Ebecryl 3702 | proprietary | Oligomer | Bisphenol A epoxy acrylate oligomer | Cytec |
| Ebecryl 3708 | proprietary | Oligomer | fatty-acid modified bisphenol A epoxy acrylate | Cytec |
| Esacure KIP150 | proprietary | Photoinitiator | oligo-[2-hydroxy-2-methyl-1-[4-(1-methylvinyl)phenyl] propanone] | Lamberti |
| Irgacure 651 | 24650-42-8 | Photoinitiator | 2,2-dimethoxy-2-phenylacetophenone | Ciba |
| Irgacure 819 | 162881-26-7 | Photoinitiator | bis(2,4,6-trimethylbenzoyl)-phenylphosphineoxide | Ciba |
| Irgacure 907 | 71868-10-5 | Photoinitiator | 2-methyl-1-[4-(methylthio)phenyl]-2-morpholinopropanone-1 | Ciba |
| Kayarad HX220 | 96915-49-0 | Oligomer | Acrylate ester of modified NPG-Pivalate polyester | Nippon Kayaku |
| Kayarad HX620 | 96915-49-0 | Oligomer | Acrylate ester of modified NPG-Pivalate polyester | Nippon Kayaku |
| NEORAD E-20 | proprietary | Oligomer | fatty-acid modified bisphenol A epoxy acrylate | DSM NeoResins+ |
| NNDMA | 2680-03-7 | Diluent monomer | N,N-dimethylcrylamide | Jarchem Industries or Kowa America |
| PRO 7101 | 96915-49-0 | Oligomer | polyester diacrylate | |
| SR 440 | 29590-42-9 | Diluent Monomer | acrylate ester Monomer | Sartomer |
| SR 489 | 3076-04-8 | Diluent Monomer | tridecyl acrylate | Sartomer |
| SR489D | 3076-04-8 | Diluent Monomer | tridecyl acrylate monomer | Sartomer |
| SR 495 | 110489-05-9 | Diluent Monomer | acrylate ester monomer | Sartomer |
| SR531 | proprietary | Diluent Diacrylate Monomer | cyclic trimethylolpropane formal acrylate diluent | Sartomer |

TABLE 1

Heat Resistant UV Cure Compositions

| Ingredients | 1 Wt. % | 2 Wt. % | 3 Wt. % | 4 Wt. % | 5 Wt. % | 6 Wt. % | 7 Wt. % | 8 Wt. % |
|---|---|---|---|---|---|---|---|---|
| Ebecryl 3702 | 35.0 | | | | | | | |
| Ebecryl 3708 | | 45.0 | 45.0 | 30.0 | 30.0 | | 25.0 | |
| CN 111 | | | | | | 44.0 | | |
| CN 118 | 45.0 | | | | | | | 43.4 |
| CN 2101 | | | | | | | | |
| CN 120Z | | | | 38.0 | 42.0 | | | |
| NeoRad E-20 | | 35.0 | 35.0 | | | 44.0 | 55.0 | |
| SR 489 | | | 11.0 | | | | 11.0 | |
| SR 495 | 11.0 | | | | | | | 18.0 |
| SR 440 | | | | | | 7.0 | | |
| NNDMA | 6.0 | 5.0 | 6.0 | | | 3.0 | 6.0 | 6.0 |
| Kayarad HX220 | | | | | 26.0 | | | |
| Kayarad HX620 | | 13.0 | | 30.0 | | | | 30.0 |
| Irgacure 651 | 1.0 | 2.0 | 1.0 | 1.0 | 1.0 | 1.0 | 1.0 | 0.8 |
| Irgacure 907 | 1.0 | | 1.0 | 1.0 | 1.0 | 1.0 | 1.0 | 0.8 |
| Silquest A-189 | 1.0 | | 1.0 | | | | 1.0 | 1.0 |
| Total | 100 | 100 | 100 | 100 | 100 | 100 | 100 | 100 |
| % Mass Loss: 100 hrs. @ 180° C. | <8.0 | <6.0 | <8.0 | <6.0 | <8.0 | <10.0 | <8.0 | <8.0 |

TABLE 2

| Ingredients | Example 9 Wt. Percent | Example 10 Wt. Percent | Example 11 Wt. Percent | Example 12 Wt. Percent | Example 13 Wt. Percent | Example 14 Wt. Percent | Example 15 Wt. Percent |
|---|---|---|---|---|---|---|---|
| EBECRYL 3708 | 45.00 | | | | 43.00 | 43.00 | 45.00 |
| CN-118 | | 67.00 | | | | | |
| CN-116 | | | 97.00 | | | | |
| CN-2101 | | | | 83.00 | | | |
| NEORAD E-20 | 35.00 | | | | 33.00 | 33.00 | 34.00 |
| CD-595 | | 30.00 | | 15.00 | | | |
| NNDMA | 6.00 | | | | 6.00 | 6.00 | 6.00 |
| SR489 | 11.00 | | | | 11.00 | 11.00 | 11.00 |
| Irgacure 907 | 1.00 | | | | | | |
| Irgacure 651 | 1.00 | 1.00 | 1.00 | 1.00 | | | |
| Irgacure 819 | | | | | 1.00 | 1.00 | 1.00 |
| Chivacure BMS | | | | | 3.00 | | |
| Esacure KIP150 | | 1.00 | 1.00 | 1.00 | | | 3.00 |
| Chivacure 2-ITX | | | | | | 2.00 | |
| CN-549 | | | | | 2.00 | 3.00 | |
| A-189 | 1.00 | 1.00 | 1.00 | | 1.00 | 1.00 | |
| Total | 100.00 | 100.00 | 100.00 | 100.00 | 100.00 | 100.00 | 100.00 |
| Heat Resistance Test Results, % Mass Loss: 100 hrs @ 180° C. | 5.2 | <10 | <10 | <10 | <10 | <10 | <10 |

TABLE 3

| Ingredients | Example 16 Wt. Percent | Example 17 Wt. Percent | Example 18 Wt. Percent | Example 19 Wt. Percent |
|---|---|---|---|---|
| PRO 7101 | | 40.00 | 35.00 | |
| Ebecryl 3708 | 40.00 | | | 47.20 |
| Neo Rad E-20 | 36.00 | 40.00 | 42.50 | 32.30 |
| Ebecryl 3605 | | 17.50 | 20.00 | |
| NNDMA | 4.00 | | | 6.00 |
| SR489D | 10.00 | | | |
| SR531 | | | | |
| Irgacure 651 | 1.00 | | | |
| Irgacure 907 | 1.00 | | | |
| Irgacure 819 | | | | |
| Daracure 1173 | | 2.50 | 2.50 | 3.10 |
| Silquest A 189 | 1.00 | | | |
| CD262 | | | | 11.40 |
| Dow Corning 57 | | | | |
| Dow Corning 190 | | | | |

TABLE 3-continued

| | | | | |
|---|---|---|---|---|
| CN120Z | 5.00 | | | |
| NNDMA | 2.00 | | | |
| Total | 100.00 | 100.00 | 100.00 | 100.00 |

| Test Results | Example 16 Test Result | Example 17 Test Result | Example 18 Test Result | Example 19 Test Result |
|---|---|---|---|---|
| Viscosity @ 50 1/s (m · Pas) | 5000-7000 | 4500 | 6550 | 5757 |
| TEM Results for cured film of composition | | | | |
| Tensile MPa | >20 | 14.3 | 19.4 | 31.8 |
| Elongation % | >10 | 18.4 | 20.5 | 10.2 |
| Modulus MPa | 450-750 | 180.2 | 292.3 | 747.6 |
| Heat Resistance Results, % Mass Loss: 100 hrs | 5.2 @ 180° C. | 8.6 @ 200° C. | 7.6 @ 200° C. | 7.4 @ 200° C. |

TABLE 4

| Name of Ingredient | Example 20 Wt. Percent | Example 21 Wt. Percent | Example 22 Wt. Percent |
|---|---|---|---|
| PRO 7101 Ebecryl 3708 | 47.20 | 40.00 | 44.00 |
| Neo Rad E-20 | 32.30 | 36.00 | 35.00 |
| Ebecryl 3605 | | | |
| NNDMA | 5.96 | 4.00 | 7.00 |
| SR489D | | 8.60 | |
| SR531 | | | |
| Irgacure 651 | | 1.00 | |
| Irgacure 907 | | 1.00 | |
| Irgacure 819 | | | 4.00 |
| Daracure 1173 | 3.11 | | |
| Silquest A 189 | | 1.00 | |
| CD262 | 11.43 | | 10.00 |
| Dow Corning 57 | | 0.70 | |
| Dow Corning 190 | | 0.70 | |
| CN120Z | | 5.00 | |
| NNDMA | | 2.00 | |
| Total | 100.00 | 100.00 | 100.00 |

| Test | Example 20 Test Result | Example 21 Test Result | Example 22 Test Result |
|---|---|---|---|
| Viscosity @ 50 1/s (m · Pas) | 5800 | 6750 | 5500 |
| TEM Results for cured film of composition | | | |
| Tensile MPa | 34.9 | 26.0 | 33.0 |
| Elongation % | 25.0 | 33.0 | 24.0 |
| Modulus MPa | 781.9 | 528.0 | 780.0 |
| Heat Resistance Results, % Mass Loss: 100 hrs | <10 @ 200° C. | <10 @ 180° C. | <10 @ 180° C. |

Table 1 and 2 shows Examples of the Instant Claimed Invention.

Table 3 shows Example 18 and 19 as regular modulus versions of the radiation curable coatings.

Regular Modulus is defined as a cured film of the radiation curable coating having a Modulus, as measured by TEM of no more than about 450 MPa, preferably no more than about 400 MPa, more preferably no more than about 300 MPa, more highly preferably no more than about 200 MPa and most highly preferably no more than about 180 MPa and most preferred no more than about 150 MPa.

Table 3 shows Examples 17 and 20 as "high modulus" versions of the instant claimed invention.

High Modulus is defined as a cured film of the radiation curable coating having a Modulus, as measured by TEM of at least about 450 MPa, preferably at least about 500 MPa, more preferably at least about 600 MPa, more highly preferably at least about 700 MPa and most highly preferably at least about 780 MPa.

Table 4 shows "high modulus" versions of the radiation curable coatings of the instant claimed invention. High Modulus is defined as a cured film of the radiation curable coating having a Modulus, as measured by TEM of at least about 500 MPa, preferably at least about 600 MPa, more preferably at least about 700 MPa, more highly preferably at least about 780 MPa.

Examples 17, 18 and 20 show high temperature resistance at 200° C.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed:

1. A Radiation Curable Coating composition, which may be used as an inner primary coating, an outer primary coating, a single coat, a matrix, or a buffer resin composition, comprising:
   (a) at least one radiation-curable oligomer wherein said at least one radiation curable oligomer is a fatty-acid modified epoxy acrylate;

(b) at least one ethylenenic unsaturated reactive diluent;
(c) one or more photoinitiators,
(d) optionally one or more additives selected from the group consisting of
  (d1) stabilizing additives, and
  (d2) adhesion promoting additives;
wherein said composition further optionally comprises a photosensitizer;
wherein said oligomer(s) and diluent(s) are selected from the group that does not include moieties with Urethane chemistry;
wherein said at least one radiation-curable oligomer is present in said composition in an amount from about 40 weight percent to about 99 weight percent;
wherein said at least one ethylenenic unsaturated reactive diluent is present in an amount of from about 1 weight percent to about 60 weight percent;
wherein said fatty-acid modified epoxy acrylate has between 12 and 28 carbon atoms in the backbone and is an aromatic or cycloaliphatic compound or resin comprising one or more epoxy groups per molecule;
wherein said radiation curable composition does not include any pigments, dyes or other color changing moieties;
wherein the photoinitiator is selected from the group consisting of isobutyl benzoin ether;
2,4,6 trimethylbenzoyl;
diphenylphosphine oxide;
bis(2,4,6 trimethylbenzoyl)phenylphosphine oxide (sold as Irgacure 819);
1 hydroxycyclohexylphenylketone;
2 benzyl 2 dimethylamino 1 (4 morpholinophenyl) butan 1 one;
2,2 dimethoxy 2 phenylacetophenone;
perfluorinated diphenyltitanocene;
2 methyl 1[4 (methylthio)phenyl] 2 (4 morpholinyl) 1 propanone;
2 hydroxy 2 methyl 1 phenylpropan 1 one;
4 (2 hydroxyethoxy)phenyl 2 hydroxy 2 propyl ketone dimethoxyphenylacetophenone;
1 (4 isopropylphenyl) 2 hydroxy 2 methylpropan 1 one;
1 (4 dodecylphenyl) 2 hydroxy 2 methylpropan 1 one;
4 (2 hydroxyethoxy)phenyl 2 (2 hydroxy 2 propyl) ketone;
diethoxyphenyl acetophenone;
a mixture of (2,6 dimethoxybenzoyl) 2,4,4 trimethylpentylphosphine oxide and 2 hydroxy 2 methyl 1 phenyl propan 1 one;
benzophenone;
1 propanone;
2 methyl 1 1 (4 (methylthio)phenyl)2 (4 morpholinyl);
Daracure 1173, available from Ciba, with a Chemical Abstracts Services Registry Number of 7473 98 5 and an aryl-ketone chemistry;
Esacure KIP 150, available from Lamberti, with a proprietary formula and a chemistry of oligo [2 hydroxy 2 methyl 1[4(1 methylvinyl)phenyl] propanone];
Irgacure 651, available from Ciba, with a Chemical Abstracts Services Registry Number of 24650-42-8 and a chemistry of 2,2 dimethoxy 2 phenylacetophenone;
Irgacure 819, available from Ciba, with a Chemical Abstracts Services Registry Number of 162881 26 7 and a chemistry of bis(2,4,6 trimethylbenzoyl) phenylphosphineoxide;
Irgacure 907, available from Ciba, with a Chemical Abstracts Services Registry Number of 71868 10 5 and a chemistry of 2 methyl 1[4 (methylthio)phenyl] 2 morpholinopropanone 1;
and wherein said composition, after cure, has resistance to thermal degradation as measured by less than 10% weight loss after exposure of cured specimens in a natural convection furnace for 100 hours at 200° C.

2. The composition of claim 1 in which said fatty-acid modified epoxy acrylate is selected from the group consisting of
CN-116, a fatty-acid modified bisphenol A epoxy acrylate available from Sartomer;
CN-118, a fatty-acid modified bisphenol A available from Sartomer;
CN120Z, with Chemical Abstracts Service Registry Number 55818-57-0 available from Sartomer; and
CN-2101, a fatty-acid modified bisphenol A epoxy acrylate available from Sartomer.

3. An Optical Fiber comprising at least one Coating Layer of the composition of claim 1, wherein said Coating Layer is
a Single Coat Layer,
an Inner Primary Coating Layer,
an Outer Primary Layer, or
an Upjacketing Coating Layer,
wherein said composition has been applied as a liquid and cured to a solid layer.

4. An Optical Fiber of claim 3, wherein said Optical Fiber is a Hermetically Sealed Optical Fiber.

5. A process to coat an Optical fiber comprising:
a) providing an optical fiber that is being manufactured at a line speed of between about 50 meters/minute and about 1000 meters/minute; and
b) coating the optical fiber with a radiation curable coating composition of claim 1.

* * * * *